(12) United States Patent
Huang et al.

(10) Patent No.: US 7,966,486 B2
(45) Date of Patent: Jun. 21, 2011

(54) COMPUTER SYSTEM WITH DUAL BASIC INPUT OUTPUT SYSTEM AND OPERATION METHOD THEREOF

(75) Inventors: Kao-Wei Huang, Taipei (TW);
Chin-Hung Lu, Taipei (TW)

(73) Assignee: Inventec Corporation, Taipei (TW)

( * ) Notice: Subject to any disclaimer, the term of this patent is extended or adjusted under 35 U.S.C. 154(b) by 655 days.

(21) Appl. No.: 12/047,136

(22) Filed: Mar. 12, 2008

(65) Prior Publication Data

US 2009/0193242 A1    Jul. 30, 2009

(30) Foreign Application Priority Data

Jan. 30, 2008  (TW) ................................. 97103471 A

(51) Int. Cl.
*G06F 9/00* (2006.01)
*G06F 9/24* (2006.01)
*G06F 13/00* (2006.01)

(52) U.S. Cl. ................................. 713/2; 713/1; 710/316
(58) Field of Classification Search .................... 713/2, 1
See application file for complete search history.

(56) References Cited

U.S. PATENT DOCUMENTS

| 5,793,943 | A * | 8/1998 | Noll .................................. 714/6 |
| 6,079,016 | A * | 6/2000 | Park .................................. 713/2 |
| 6,513,113 | B1 * | 1/2003 | Kobayashi ........................ 713/2 |
| 6,651,188 | B2 * | 11/2003 | Harding et al. ................. 714/38 |
| 6,892,323 | B2 * | 5/2005 | Lin .................................. 714/36 |
| 7,451,304 | B2 * | 11/2008 | Chang et al. ..................... 713/2 |
| 7,644,263 | B2 * | 1/2010 | Fujii et al. ........................ 713/1 |
| 2005/0273588 | A1 * | 12/2005 | Ong et al. ......................... 713/2 |
| 2006/0236084 | A1 | 10/2006 | Wu et al. |
| 2008/0141016 | A1 * | 6/2008 | Chang et al. ..................... 713/2 |
| 2008/0282017 | A1 * | 11/2008 | Carpenter et al. ............ 710/316 |
| 2009/0172472 | A1 * | 7/2009 | Sun et al. ........................ 714/36 |

* cited by examiner

*Primary Examiner* — Suresh K Suryawanshi
(74) *Attorney, Agent, or Firm* — J.C. Patents

(57) ABSTRACT

A computer system including a central processing unit (CPU), a chipset, a first bus, a second bus, a first memory, a second memory, and a logic control circuit is disclosed. The chipset is coupled to the CPU. The first bus and the second bus are respectively coupled to the chipset. The first memory is coupled to the chipset through the first bus for storing a first basic input output system (BIOS). The second memory is coupled to the chipset through the second bus for storing a second basic input output system (BIOS). The logic control circuit detects a state of the first bus and controls the chipset to select to access the first memory through the first bus or select to access the second memory through the second bus according to the state of the first bus.

9 Claims, 2 Drawing Sheets

COMPUTER SYSTEM WITH DUAL BASIC INPUT OUTPUT SYSTEM AND OPERATION METHOD THEREOF

CROSS-REFERENCE TO RELATED APPLICATION

This application claims the priority benefit of Taiwan application serial no. 97103471, filed on Jan. 30, 2008. The entirety of the above-mentioned patent application is hereby incorporated by reference herein and made a part of this specification.

BACKGROUND OF THE INVENTION

1. Field of the Invention

The present invention generally relates to a computer system, in particular, to a computer system with dual basic input output system (BIOS) and an operation method thereof.

2. Description of Related Art

The basic input output system (BIOS), as the most basic motherboard system stored in a flash memory, is mainly used to set hardware settings and some relevant parameters of the motherboard. It is well known that, such data are quite important and are not permitted to be damaged; otherwise, the motherboard cannot be normally booted or a part of the functions cannot work normally. Accordingly, in the conventional arts, a computer system with auxiliary BIOS is provided, so as to solve the problem that the computer system cannot be normally booted any more when the single BIOS is damaged.

However, in the current computer system with auxiliary BIOS, the BIOS automatic back-up and switch control mechanism is designed through a unique bus of the BIOS connected to the computer system, and then a set of logic determining circuits is used for detection, so as to exchange signals with the logic address. Such method of exchanging logic address signals can be used to perform block partition on a single read only memory for storing the BIOS at address line serial numbers of higher bits, so as to backup and switch the BIOS.

In addition, another design is further proposed, that is, two independent BIOS memories storing the same content are provided, and meanwhile, an enable line of an integrated circuit, and a control signal are further added, so as to switch between the two independent BIOS memories. However, no matter the single BIOS or the two independent BIOS memories are used, they cannot solve the current problem that the BIOS back-up and exchange mechanism cannot work any more once the single BIOS bus connected to the computer system is damaged or failed, and what's worse, the computer system even cannot perform the initial power on self test (POST) operation.

SUMMARY OF THE INVENTION

Accordingly, the present invention is directed to a computer system with dual BIOS and an operation method thereof, which is used to avoid the problem that the computer system cannot be booted any more once a single bus used between a chipset and a memory is damaged.

The present invention provides a computer system, which includes a central processing unit (CPU), a chipset, a first bus, a second bus, a first memory, a second memory, and a logic control circuit. The chipset is coupled to the CPU. The first bus is coupled to the chipset. The second bus is coupled to the chipset. The first memory is coupled to the chipset through the first bus for storing a first BIOS. The second memory is coupled to the chipset through the second bus for storing a second BIOS. The logic control circuit is used to detect a state of the first bus and controls the chipset to select to access the first memory through the first bus, or select to access the second memory through the second bus according to the state of the first bus.

According to an embodiment of the present invention, the chipset includes a south bridge chip, and the first bus and the second bus are both coupled to the south bridge chip.

According to an embodiment of the present invention, the logic control circuit generates a control signal according to the state of the first bus, and when the control signal shows that the first bus and the first BIOS work normally, the chipset selects to access the first memory through the first bus. In addition, when the chipset selects to access the first memory through the first bus, the computer system is booted through executing the first BIOS.

According to an embodiment of the present invention, the logic control circuit further detects a state of the second bus and controls the chipset to select to access the second memory through the second bus or select to access the first memory through the first bus according to the state of the second bus.

According to an embodiment of the present invention, the logic control circuit generates a control signal according to the state of the first bus and the state of the second bus, and if the control signal shows that the first bus or the first BIOS fails, and the control signal shows that the second bus and the second BIOS work normally, the chipset selects to access the second memory through the second bus. In addition, when the chipset selects to access the second memory through the second bus, the computer system is booted through executing the second BIOS.

According to an embodiment of the present invention, the logic control circuit is a complex programmable logic device (CPLD), a microcontroller, or a baseboard management controller (BMC).

According to an embodiment of the present invention, the logic control circuit includes a first detection unit, a second detection unit, a logic unit, and a gate unit. The first detection unit is used to detect a state of the first bus and a state of the first BIOS, and to output a first detecting result. The second detection unit is used to detect a state of the second bus and a state of the second BIOS, and to output a second detecting result. The logic unit is coupled to the first detection unit and the second detection unit, for generating a control signal according to the first detecting result and the second detecting result. The gate unit is coupled between the logic unit and the chipset, for determining whether to transmit the control signal to the chipset or not.

According to an embodiment of the present invention, the first memory and the second memory are both non-volatile memories.

The present invention provides an operation method of a computer system, in which a chipset of the computer system is coupled to a first memory and a second memory through a first bus and a second bus respectively. The operation method includes the following steps: detecting a state of the first bus, and then controlling the chipset to select to access a first BIOS of the first memory through the first bus or select to access a second BIOS of the second memory through the second bus according to the state of the first bus.

According to an embodiment of the present invention, the operation method further includes: detecting a state of the second bus, and then determining whether to control the chipset to select to access the second memory through the second bus or not according to the state of the second bus.

According to an embodiment of the present invention, the operation method further includes: controlling the chipset to select to access the second memory through the second bus and executing a booting program through the second BIOS, if it is detected that the state of the first bus or the first BIOS is abnormal, and it is detected that the second bus and the second BIOS work normally.

According to an embodiment of the present invention, the operation method further includes: not permitting the computer system to be booted, if it is detected that the first bus and the second bus are both abnormal.

According to an embodiment of the present invention, the operation method further includes: controlling the chipset to select to access the first memory through the first bus and executing a booting program through the first BIOS, if it is detected that the first bus and the first BIOS work normally.

According to the present invention, the chipset is coupled to the first memory and the second memory through the first bus and the second bus respectively, which can avoid the problem that the computer system cannot be booted any more once the single bus is damaged.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
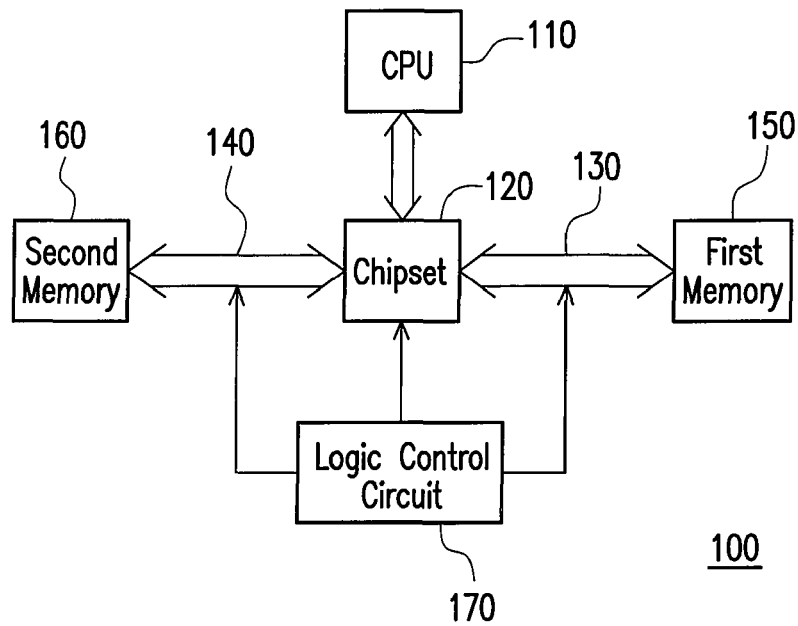
FIG. 1 is a schematic view of a computer system according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic view of a computer system according to an embodiment of the present invention. Referring to FIG. 1, a computer system 100 includes a CPU 110, a chipset 120, a first bus 130, a second bus 140, a first memory 150, a second memory 160, and a logic control circuit 170.

The chipset 120 is coupled to the CPU 110. The first bus 130 and the second bus 140 are coupled to the chipset 120. The first memory 150 is coupled to the chipset 120 through the first bus 130, for storing a first BIOS.

The second memory 160 is coupled to the chipset 120 through the second bus 140, for storing a second BIOS. The logic control circuit 170 is used to detect a state of the first bus 130, and controls the chipset 120 to select to access the first memory 150 through the first bus 130 or select to access the second memory 160 through the second bus 140 according to the state of the first bus 130.

Referring to FIG. 1, the chipset 120 further includes a south bridge chip, and the first bus 130 and the second bus 140 are both coupled to the south bridge chip, and thus when the computer system 100 is booted, the south bridge chip may access the first memory 150 through the first bus 130, or access the second memory 160 through the second bus 140.

In this embodiment, the logic control circuit 170 is, for example, a complex programmable logic device (CPLD), a microcontroller, or baseboard management controller (BMC). In addition, the first memory 150 and the second memory 160 are both non-volatile memories.

The coupling relation among each element and the function of each element in the computer system 100 have been illustrated. Then, the operations of the computer system 100 are further illustrated below. Firstly, once the computer system 100 is powered on, the logic control circuit 170 generates a control signal according to the state of the first bus 130. If the control signal shows that the first bus 130 and the first BIOS work normally, the chipset 120 may select to access the first memory 150 through the first bus 130. In this embodiment, if the chipset 120 selects to access the first memory 150 through the first bus 130, the computer system 100 is booted through executes the first BIOS for booting.

In addition, the logic control circuit 170 may also detect the state of the second bus 140, and control the chipset 120 to select to access the second memory 160 through the second bus 140 or select to access the first memory 150 through the first bus 130 according to the state of the second bus 140.

Therefore, besides according to the state of the first bus 130, the logic control circuit 170 further generates a control signal according to the state of the second bus 140. That is, if the control signal shows that the first bus 130 or the first BIOS fails, and shows that the second bus 140 and the second BIOS are in normal state, the logic circuit controls the chipset 120 to select to access the second memory 160 through the second bus 140. If the chipset 120 selects to access the second memory 160 through the second bus 140, the computer system 100 is booted through executing the second BIOS.

In the above embodiment, the logic control circuit 170 is, for example, the CPLD, microcontroller, or BMC, but the present invention is not limited here. Another embodiment is listed below for illustration.

Figure 2:
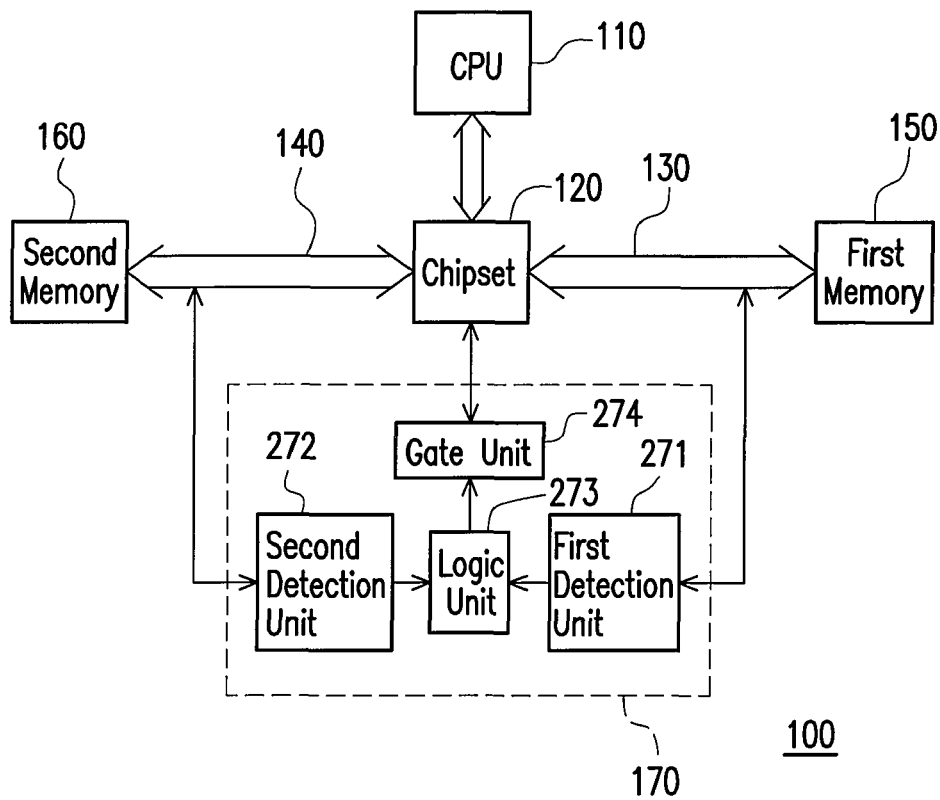
FIG. 2 is a schematic view of a computer system according to another embodiment of the present invention.

FIG. 2 is a schematic view of a computer system 100 according to another embodiment of the present invention. Referring to FIG. 2, the logic control circuit 170 includes a first detection unit 271, a second detection unit 272, a logic unit 273, and a gate unit 274. The first detection unit 271 is used to detect the state of the first bus 130 and the state of the first BIOS, and to output a first detecting result. For example, if the first bus 130 or the first BIOS is in the abnormal state, the first detecting result is, for example, "0"; if the first bus 130 and the first BIOS are in the normal state, the first detecting result is, for example, "1".

The second detection unit 272 is used to the state of the second bus 140 and the state of the second BIOS, and to output a second detecting result. For example, if the second bus 140 or the second BIOS is in the abnormal state, the second detecting result is, for example, "0"; if the second bus 140 and the second BIOS are in the normal state, the second detecting result is, for example, "1".

The logic unit 273 is coupled to the first detection unit 271 and the second detection unit 272, for generating a control signal according to the first detecting result and the second detecting result. For example, when the first detecting result received by the logic unit 273 is "1", and the second detecting result is "0", it indicates that the first bus 130 is in the normal state, so that a control signal is generated to control the chipset 120 to select to access the first memory 150 through the first bus 130. When the first detecting result received by the logic unit 273 is "0", and the second detecting result is "1", it indicates that the first bus 130 is in the abnormal state, the second bus 140 is in the normal state, so that a control signal is generated, thereby controlling the chipset 120 to select to access the second memory 160 through the second bus 140.

In addition, when the first detecting result received by the logic unit 273 is "0", and the second detecting result is "0", it indicates that the first bus 130 and the second bus 140 are both in the abnormal, so that the computer system 100 is not permitted to be booted. When the first detecting result received by the logic unit 273 is "1", and the second detecting result is "1", it indicates that the first bus 130 and the second bus 140 are both in the normal state, so that a control signal is generated to control the chipset 120 to select to access the preset memory through the preset bus.

The gate unit 274 is coupled between the logic unit 273 and the chipset 120, for determining whether to transmit the control signal to the chipset 120 or not. For example, after the computer system 100 is powered on, and before the chipset 120 is completely activated, the gate unit 274 does not permit to transmit the control signal generated by the logic unit 273 to the chipset 120. Instead, the gate unit 274 waits until an enable signal is generated after the chipset 120 is activated, and then transmits the control signal generated by the logic unit 273 to the chipset 120 according to the enable signal, such that the chipset 120 determines to access the first memory 150 through first bus 130 or access the second memory 160 through the second bus 140 according to the control signal.

Figure 3:
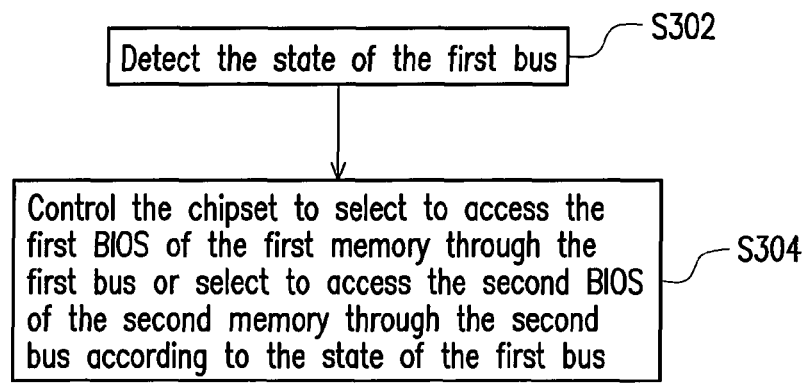
FIG. 3 is a flow chart of an operation method of the computer system according to an embodiment of the present invention.

Through the illustrations about the above embodiment, an operation method of the computer system 100 can be concluded. FIG. 3 is a flow chart of an operation method of a computer system according to an embodiment of the present invention. In this embodiment, the chipset of the computer system is coupled to the first memory and the second memory through the first bus and the second bus respectively. Referring to FIG. 3, firstly, in step S302, the state of the first bus is detected. That is, the computer system can detect whether the first bus is in the normal state or not by using the logic control circuit.

Then, in step S304, according to the state of the first bus, the chipset is controlled to select to access the first BIOS of the first memory through the first bus, or select to access the second BIOS of the second memory through the second bus. That is, when it is detected that the first bus works normally, the logic control circuit controls the chipset to access the first BIOS of the first memory through the first bus. When it is detected that the first bus cannot work normally, the logic control circuit controls the chipset to access the second BIOS of the second memory through the second bus. In this manner, it can avoid the problem that the computer system cannot be booted any more once the single bus is damaged.

Figure 4:
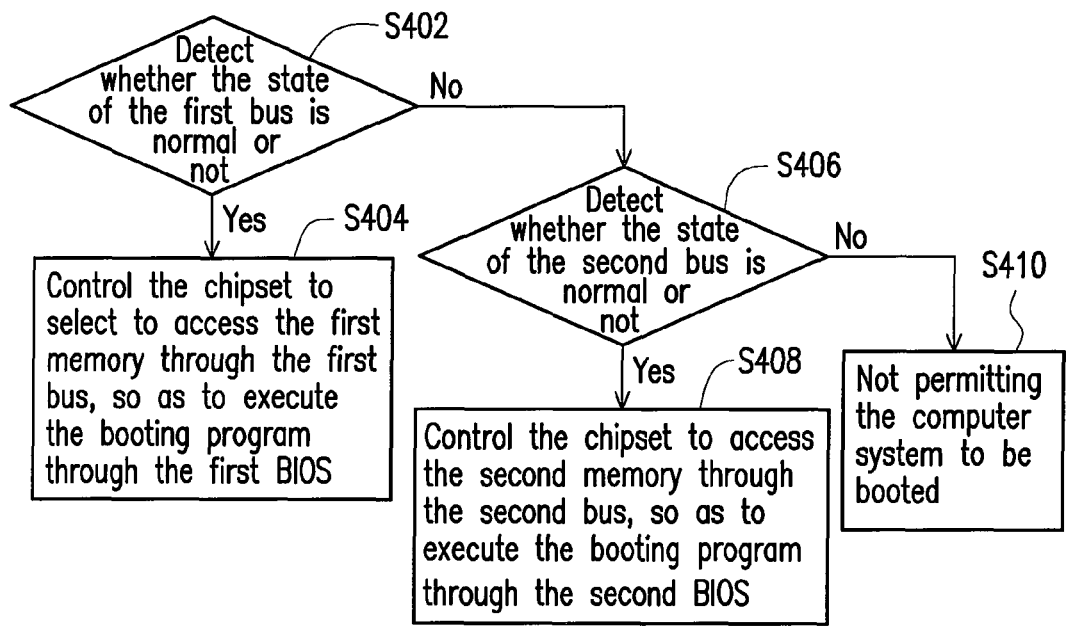
FIG. 4 is a flow chart of an operation method of the computer system according to another embodiment of the present invention.

In order to describe each step of the operation method of the computer system more clearly, an embodiment is further listed below to illustrate the detailed flow of the operation method of the computer system in the present invention. FIG. 4 is a flow chart of an operation method of the computer system according to another embodiment of the present invention. Referring to FIG. 4, firstly, after the computer system is powered on, the state of the first bus is detected (step S402).

When it is detected that the first bus is in the normal state, and the first BIOS is also in the normal state, as shown in step S404, the chipset is controlled to select to access the first memory through the first bus, so as to execute the booting program through the first BIOS, and thus booting the computer system.

If it is detected that the first bus is in the abnormal state, as shown in step S406, the state of the second bus is detected. Then, when it is detected that the second bus is in the normal state, and the second BIOS is also in the normal state, as shown in step S408, the chipset is controlled to select to access the second memory through the second bus, so as to execute the booting program through the second BIOS, and thus booting the computer system.

In addition, if it is detected that the second bus is in the abnormal state (the first bus has already been in the abnormal state), as shown in step S410, the computer system is not permitted to be booted.

To sum up, in the present invention, the chipset is coupled to the first memory through the first bus, and is coupled to the second memory through the second bus. In this manner, it can avoid the problem that the computer system cannot access the BIOS in the memory for being booted once a single bus used between the chipset and the memory is damaged or failed.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer system, comprising:
   a central processing unit (CPU);
   a chipset, coupled to the CPU;
   a first bus, coupled to the chipset;
   a second bus, coupled to the chipset;
   a first memory, coupled to the chipset through the first bus for storing a first basic input output system (BIOS);
   a second memory, coupled to the chipset through the second bus for storing a second BIOS; and
   a logic control circuit, for detecting a state of the first bus and controlling the chipset to select to access the first memory through the first bus or select to access the second memory through the second bus according to the state of the first bus, wherein the logic control circuit comprises:
   a first detection unit, for detecting a state of the first bus and a state of the first BIOS, and outputting a first detecting result;
   a second detection unit, for detecting a state of the second bus and a state of the second BIOS, and outputting a second detecting result;
   a logic unit, coupled to the first detection unit and the second detection unit, for generating a control signal according to the first detecting result and the second detecting result; and
   a gate unit, coupled between the logic unit and the chipset, for determining whether to transmit the control signal to the chipset or not.

2. The computer system according to claim 1, wherein the chipset comprises a south bridge chip, and the first bus and the second bus are both coupled to the south bridge chip.

3. The computer system according to claim 1, wherein the logic control circuit generates a control signal according to the state of the first bus, and when the control signal shows that the first bus and the first BIOS work normally, the chipset selects to access the first memory through the first bus.

4. The computer system according to claim 3, wherein when the chipset selects to access the first memory through the first bus, the computer system is booted through executing the first BIOS.

5. The computer system according to claim 1, wherein the logic control circuit further detects a state of the second bus and controls the chipset to select to access the second memory through the second bus or select to access the first memory through the first bus according to the state of the second bus.

6. The computer system according to claim 5, wherein the logic control circuit generates a control signal according to the state of the first bus and the state of the second bus, and if the control signal shows that the first bus or the first BIOS fails, and the control signal shows that the second bus and the second BIOS work normally, the chipset selects to access the second memory through the second bus.

7. The computer system according to claim 6, wherein when the chipset selects to access the second memory through the second bus, the computer system is booted through executing the second BIOS.

8. The computer system according to claim 1, wherein the logic control circuit is a complex programmable logic device (CPLD), a microcontroller, or a baseboard management controller (BMC).

9. The computer system according to claim 1, wherein the first memory and the second memory are both non-volatile memories.

* * * * *